US005640176A

United States Patent [19]

Mundt et al.

[11] Patent Number: 5,640,176
[45] Date of Patent: Jun. 17, 1997

[54] USER INTERFACE FOR EASILY SETTING COMPUTER SPEAKER VOLUME AND POWER CONSERVATION LEVELS

[75] Inventors: Kevin Warren Mundt, Spring; Randall L. Hess, Cypress; David B. Potter, Houston, all of Tex.

[73] Assignee: Compaq Computer Corporation, Houston, Tex.

[21] Appl. No.: 825,118

[22] Filed: Jan. 24, 1992

[51] Int. Cl.$^6$ .................................. G09G 5/08; G06F 1/00
[52] U.S. Cl. .................... 345/146; 364/707; 395/348
[58] Field of Search .......................... 340/706, 753, 340/754, 636; 395/159, 161, 155; 358/75; 364/492, 707; 345/145, 146, 902

[56] References Cited

U.S. PATENT DOCUMENTS

| 4,698,624 | 10/1987 | Barker et al. | 340/709 |
|---|---|---|---|
| 5,079,624 | 1/1992 | Sasuga et al. | 358/75 |
| 5,204,969 | 4/1993 | Capps et al. | 395/161 X |
| 5,230,074 | 7/1993 | Canova, Jr. et al. | 364/492 |
| 5,367,626 | 11/1994 | Morioka et al. | 395/159 |

OTHER PUBLICATIONS

Mimi Jones and Dave Myers, *Hards-On Hypercard*, pp. 1–4, 28, 143–160, 226–232,383–385; 1988 John Wiley & Sons, Inc.

*T1900 Series Reference Manual*, pp. 6–11 through 6–25; 1993 by Toshiba Corporation.

*Mac Write and Mac Paint*, Tim Field; 1984 McGraw-Hill, Inc. Note pp. 25–27.

*Xerox 1090 Marathon Copier Operator Manual*, Multinational Customer and Service Education; Apr. 1985, pp. 38–39.

*Primary Examiner*—Richard Hjerpe
*Assistant Examiner*—Kara Farnandez Stoll
*Attorney, Agent, or Firm*—Pravel, Hewitt, Kimball & Krieger

[57] ABSTRACT

A user interface of simplifying selection of speaker volume level and power conservation level in a computer system. An icon is presented for setting the speaker volume which includes a bar graph of relative speaker volume. By depressing left or right arrow keys the graph moves and the volume level of the speaker is changed. By depressing the down arrow key when setting the volume level, the speaker is beeped to allow for a level check during the setting process. A series of icons are used to indicate and select power conservation level. Each icon includes a battery with a faucet attached to the side of the battery. Different water flow rates indicate the various conservation levels. A human figure is located adjacent the faucet to indicate the user-customerized conservation level.

13 Claims, 4 Drawing Sheets

5,640,176

USER INTERFACE FOR EASILY SETTING COMPUTER SPEAKER VOLUME AND POWER CONSERVATION LEVELS

BACKGROUND OF THE INVENTION

1. Field of the Invention

The invention relates to computer systems, and more particularly to a user interface for allowing the user to easily and intuitively set speaker volume levels and power conservation levels in a battery-powered computer.

2. Description of the Related Art

Personal computers are being utilized with greater and greater frequency. With the rise of new software applications, such as graphical user interface applications, more and more people are beginning to use personal computers. Many of these people have not had experience using or operating personal computers. These new users are not in a group which has been using computers for many years and has become experienced with applications which use command lines for entry and control, such as those applications under operating systems such as CP/M or MS/DOS or on mainframe applications, where complicated command structures and input requirements are common. To properly utilize those operating systems or computers the user had to become familiar with the complicated commands that were required. As a user became experienced, the command structures became familiar. However, these commands were often a great struggle for neophyte users and therefore limited the actual use of the computer and its various features and functions for those novice users. Thus there was and is a major interest in developing interface capabilities which are much more intuitive and easier to use without requiring reference to bound manuals.

This ease of use has been one of the large moving forces behind the increased trend towards the graphical user interface as popularized by the Apple Computer, Inc. Macintosh personal computer. The user interface was designed to be very intuitive, so that very little reference to a written manual was actually needed but instead most of the instructions and operating techniques could be developed directly from the user interface itself, sometimes just merely by a common arrangement and at other times by referencing on-screen help. This graphical user interface has migrated to personal computers compatible with the IBM PC with the development of the Windows program by Microsoft Corp. and to UNIX-based machines through the Open Look and X Windows standards.

It is desirable to continue this trend to other functions available in personal computers. One function which is commonly available in personal computers is a speaker having variable output levels so that the speaker volume can be changed. However, this is typically done using a command line option where an arbitrary speaker volume number is given following a command. However, merely providing the number does not provide feedback to the user as to whether the desired volume level was actually set. The user would then run the chosen application program. When the first beep occurred, the user would then know if the level was correct. If the level was not at the desired point, the user would have to retry the volume procedure, entering a different volume number. This sequence was continued until the desired level was reached. It is desirable to have a much more intuitive and user friendly approach for setting speaker volume level.

One type of computer that is becoming very popular is the battery powered notebook computer. These are relatively small computers not much larger than a sheet of paper and which weigh in the range of 4 to 8 pounds. They contain liquid crystal display (LCD) screens, hard disk drives, floppy disk drives, internal modems and numerous other devices and capabilities previously found just in desktop units. One problem with notebook computers is that they are battery powered and all of the features of the units draw power. For instance, the LCD with its flourescent lights used to provide backlighting are a major draw of power. Similarly, the hard disk drive draws a large amount of power, as does the modem and the floppy disk drive. One response to this power consumption problem has been to provide the capability to shut off various devices when not in use. One example of this is shown in U.S. Pat. No. 4,980,836 for Apparatus for Reducing Computer System Power Consumption. In units according to the patent, when no user activity is determined to be occurring, the unit automatically shuts down the hard disk drive, the floppy disk drive, the modem, the display and other circuit elements. This capability to shutdown portions of the unit when not needed is referred to as power conservation. In some versions the actual shutdown delay times were made programmable. The times were changed by running a power conservation utility program called at the operating system command line, which program then provided a list of the various time options, i.e. the hard disk drive delay time and so on, which values were then set by the user. These delay time values are generally stored in CMOS or battery backed-up memory for later reference and are then applied as the timeout values for the appropriate power down features. However, only one level or setting of the power conservation time delay values was available. To change settings the user had to perform the sequence mentioned above. But this was difficult to use under varying conditions and require a large amount of user knowledge to optimize for a particular case. Thus it would be desirable to have numerous levels of power conservation depending upon the user's particular requirements and desires, and it would be desirable to be readily able to distinguish between the level of power conservation selected.

SUMMARY OF THE INVENTION

A computer system according to the present invention provides an improved user interface for easily setting computer speaker volume and for readily informing the user of which of a series of power conservation levels is being utilized by the notebook computer. In the system of the preferred embodiment a series of icons or display segments are provided. The notebook computer is conventional in that includes a series of function keys as commonly available on an IBM PC compatible computer. However, a specific, dedicated function or special shift key is provided to provide further functionality for the function keys. By selecting the special function key and one of the individual function keys, operating sequences relating to the speaker volume control and power conservation level setting can be executed.

In each of these sequences an icon appears on the display screen to allow easily interaction with the user. In the speaker volume setting operation an angled or wedge bar graph is displayed adjacent a representation of a speaker. Below the bar graph are arrows indicating the right and left arrow keys of the computer and an arrow representing the down arrow key of the computer. By appropriately pressing the left or right arrow keys, the bar graph in the bar graph portion is moved to the left or the right, thus showing the relative speaker volume level. While the icon is displayed, if the user depresses the down arrow key, the speaker beeps to allow the user to readily determine speaker volume. Thus, while adjusting the volume by using the left or right keys, the user can simply depress the down key to hear the selected speaker volume. If the volume is not at the desired level, the appropriate left or right arrow key can be depressed and the operation repeated. Thus the user can readily set and approve a given speaker volume level without having to do the numerous iterations and random trial and error as in the prior art.

The computer system according to the preferred embodiment utilizes four different power conservation levels. The first level is considered no power conservation, where all of the devices such as the hard drive, the display backlight and the modem are constantly turned on and do not turn off after a time delay. A second level is referred to as a medium conservation level, where after certain delay periods set at what is considered to be a medium time, the various devices are turned off. A third conservation level is considered to be a high conservation level, where generally the default times are significantly shorter than those used in the medium conservation level, so that the various devices shut off sooner, thus increasing power conservation. A fourth provided alternative is a user defined or customer settable power conservation level, very similar to the previous power conservation setting techniques, where the user can individually tailor each particular power down delay time as desired. With these four settings it is then desirable to readily be able to determine and select which one is applicable. By depressing the special function key and one of the other function keys on the keyboard, an icon representing the particular active power conservation level is displayed on the screen of the personal computer. By selecting the right or left arrows, a series of icons are displayed, each icon representing and readily indicating which power conservation level is being used. The icons preferably include a side view of a exemplary battery cell, with a water faucet located at the side of the battery cell. By changing the amount of water flowing from the faucet, the power conservation level is readily indicated to the user. For instance, a very steady stream of water flowing from the faucet is used to represent a no conservation level. A medium trickle level is utilized to indicate a medium conservation level, while a slow trickle is used to indicate a high power conservation level. To indicate a customer or user defined power conservation level, a small figure of a person is placed next to the faucet with an indication that the individual is actually turning the valve on the faucet. Thus the user setting can be readily perceived. By cycling through the right and left arrows the various icons and their related power conservation settings are set in the computer. Thus the user can readily determine and set which power conservation level is being utilized by the notebook computer.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
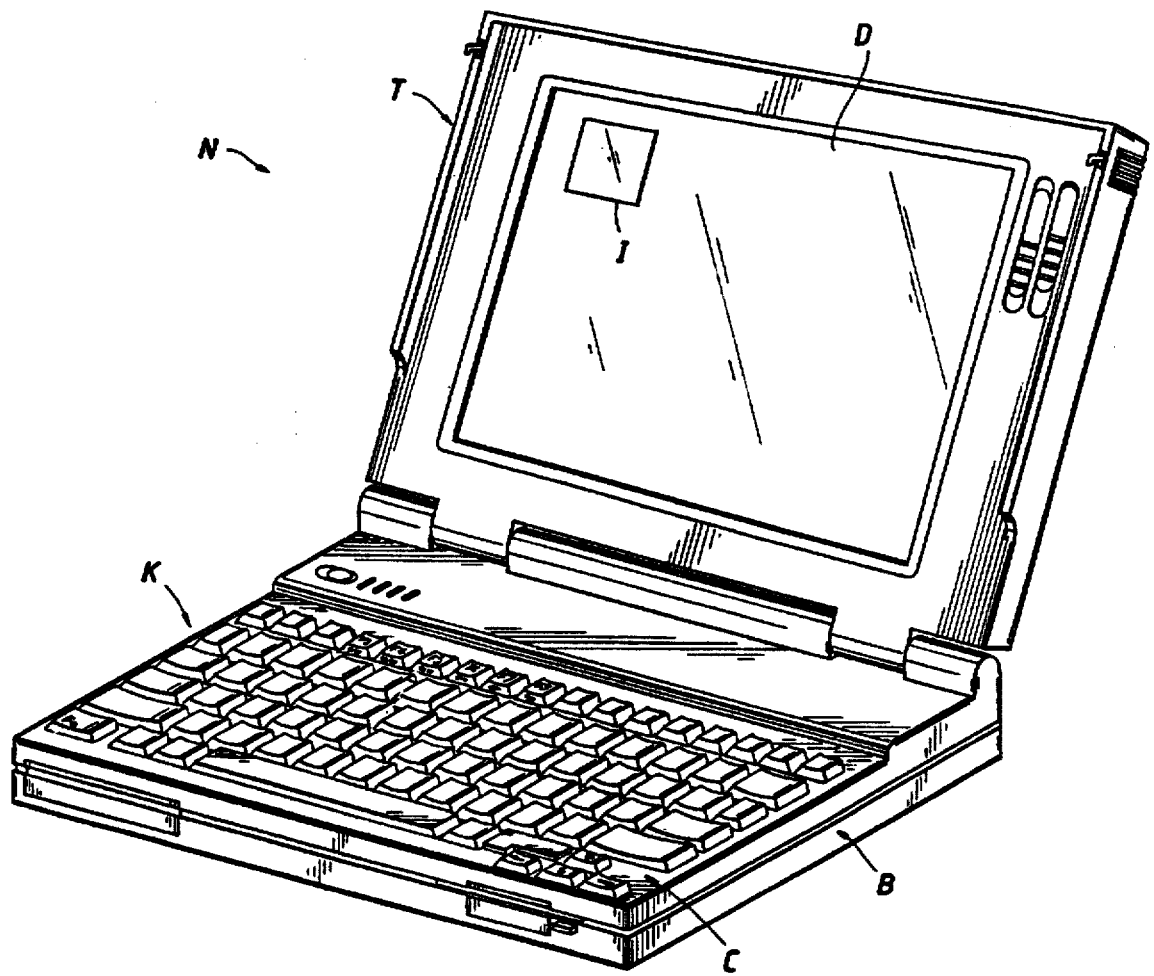
FIG. 1 is a perspective view of a notebook computer according to the present invention showing the location of an exemplary icon according to the present invention.

Referring now to FIG. 1, a notebook computer, generally referred to by the letter N, is shown. The notebook computer N includes a top portion T, which generally incorporates a liquid crystal display (LCD) D. The LCD D is used to provide a visual output for use in the interaction with the user. Optionally, the notebook computer N can include a connector for use with a external CRT monitor (not shown). The second portion of the notebook computer N is a lower half or bottom section B. Located on the top surface of the bottom section B is a keyboard K. The keyboard K is used to obtain user input to access the various functions and control the notebook computer N. In the keyboard K of the preferred embodiment a top row of function keys is provided, designated as the F1-F10 keys as common in IBM PC compatible computers. Additionally in the keyboard K is a grouping or pad of keys to provide the cursor function. These keys are generally referred to as the cursor keys, generally C. Preferably the cursor keys C include left and right arrow and up and down arrow keys to indicate left and right movement of a cursor and up and down movement of a cursor. The notebook computer N of the preferred embodiment also includes a special function key Fn, preferably located in the lower left of the keyboard K, which has encoded on it a symbol Fn to indicate it is associated with a shifted or special function of a particular key, is as common in electronic pocket calculators. Preferably the special function key Fn is used in combination with the conventional function keys F1-F10, particularly F3-F8, in the preferred embodiment to execute certain operating sequences which can be readily desired at any time. It is understood that other key arrangements could be utilized to practice the present invention.

Shown in an exemplary display upon the LCD D is an icon generally referred to by the letter L. The displayed icon can be one of several icons, particularly those utilized and developed according to the present invention as will be explained in more detail below. The icon is developed using conventional display techniques and may replace and appear over data currently being displayed on the display D. It is understood that the icon could appear anywhere on the face of the LCD D.

Figure 2:
FIG. 2 is a enlarged view of the particular keys on the notebook computer of FIG. 1 which are used to activate the routines which display the icons according to the present invention.

FIG. 2 is an enlarged view of the conventional function keys F3-F8. Located on one side of the particular keys are different legends or logos to indicate the function performed when the special function key Fn is depressed in combination with the conventional function key F3-F8. For example, simultaneous depression with the F3 key is used to alternate between normal and reverse video on the LCD D. This can be seen illustratively on the side of the F3 key. The F4 key can be used in combination with the special function key Fn to toggle between various output display modes. This is indicated by the monitor representation and liquid crystal internal display indication on the side of the F4 key. Depressing the F4 key repeatedly toggles the display through sequence of external monitor, internal monitor and both.

Proceeding to the F5 key, displayed on the side is an F5 key is a symbol used to indicate that the F5 key used in combination with the special function key Fn activates speaker volume control capability. This is shown by a speaker with an up arrow and a speaker with a down arrow. This capability is described in more detail below. The F6 key is used in combination with the special function key Fn to provide various locking features to the computer, such as a keyboard password lock, screen blanking and disk locking. Details of these particular operations are more fully described in U.S. Pat. No. 5,097,506 issued Mar. 17, 1992, entitled "Keyboard Password Lock"; U.S. Pat. No. 5,173,940 issued Dec. 22, 1992 for "Keyboard Activated Screen Blanking"; and Ser. No. 772,695 filed on Oct. 7, 1991 for "Dual Password Hard Disk Security System", which are hereby incorporated by reference herein.

The F7 key is used in combination with the special function key Fn to select the power conservation level being utilized by the notebook computer N. The reminder of this function is provided to the user by the use of the two different battery sizes on the side of the F7 key. Finally, the F8 key is utilized in combination with the special function key Fn to display the fuel gauge function, which indicates the amount of battery energy remaining and the anticipated operating time at the current power levels. Operation of the power conservation level selection and fuel gauge will be explained in greater detail below.

Figure 3:
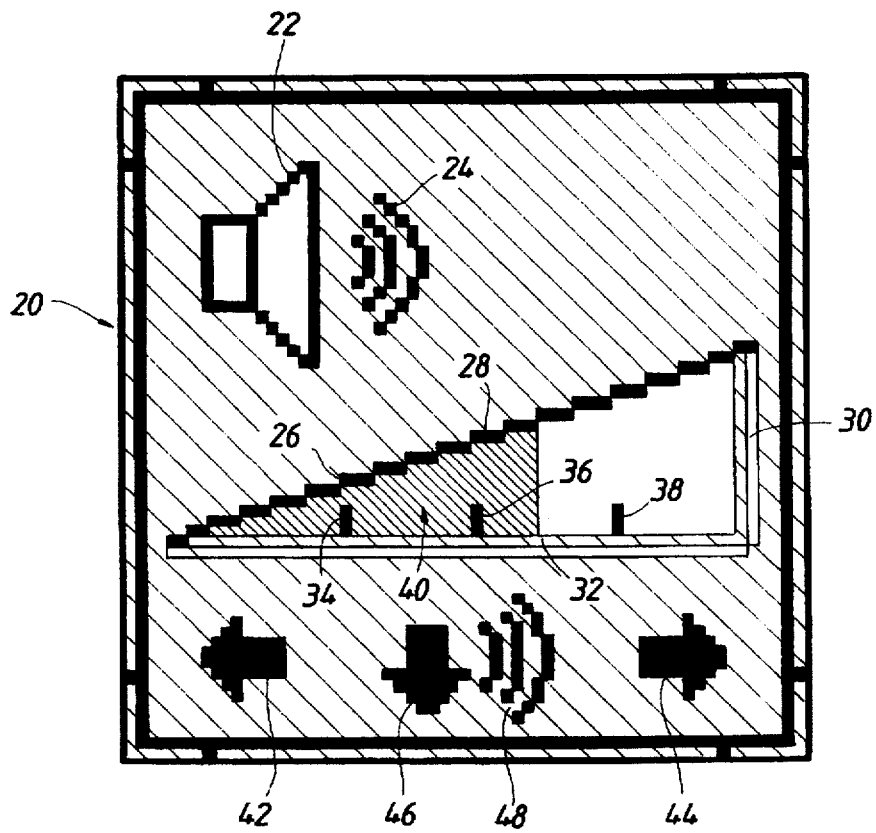
FIG. 3 is the display icon utilized during a speaker volume control setting sequence according to the present invention.

Referring now to FIG. 3, the display icon 20 according to the preferred embodiment of the present invention for utilization with speaker volume control is shown. The icons of FIGS. 3, 4 and 5A–5D are lined to represent the preferred colors representing various shades of gray, but it is understood that other colors or shades of gray could be utilized. It is understood that a notebook computer N is controlled by various operating or software sequences. It is further understood that the notebook computer N according to the preferred embodiment includes the capability to vary speaker volume in certain steps. As the hardware required to vary speaker volume is not directly part of this invention and numerous designs are well known to those skilled in the art, details of the particular hardware and actual software routines utilized to control the speaker volume itself are not provided. Further, the actual interface code utilized to display the icon and move various features are not described in detail, as these can also be readily developed or are known by those skilled in the art.

The speaker volume icon 20 includes numerous elements. First is a representation of a speaker 22, with an adjacent representation of sound waves 24. Located below the speaker 22 is a sloping bar graph 26 used to indicate relative speaker volume level. The bar graph 26 forms a generally triangular area having a hypotenuse 28, a vertical side 30 and a base 32. Located on the base at appropriate intervals are three hash marks 34, 36 and 38 to represent one quarter, one half and three quarter volume. Located inside the bar graph 26 is a filled in, colored or shaded area 40, which is used to represent the actual selected speaker volume. By having the shaded area move to the left or the right and thus also up and down, this is an indication of the relative speaker volume. Located below the bar graph 26 on the left hand portion of the icon 20 is a left arrow 42. Similarly, in the lower right hand corner is a right arrow 44. When the user depresses the left and right arrow keys while the icon 20 is displayed, the operating sequence moves the bar graph shaded area to the left or to the right, as appropriate, and also changes the volume of the speaker. Thus the user can readily adjust the volume of the speaker, with the bar graph 26 providing a graphical interface to indicate relative volume. This is in contrast to the relatively arbitrary number system commonly used in the prior art.

One other problem, as mentioned in the prior art section, is actually determining if the selected volume level is the desired volume. In the lower center of the icon 20 is a down arrow 46 with sound wave representation 48 located directly to the right. This is an indication to the user that by depressing the down arrow key while the icon 20 is displayed, a speaker beep is performed by the notebook computer N. Thus the user can readily activate the speaker to test the selected volume level. The volume level is set as noted above by using the left and right arrows 42 and 44 and moving the bar graph 26 to the desired level. The user then depresses the down arrow key and the speaker beeps. If the volume is not at the desired level, the user simply readjusts the speaker level using the left and right arrow keys and retests the speaker by depressing the down arrow key. In this manner the icon 20, in cooperation with the controller software, provides a rapid and ready user interface to allow the user to easily set and test computer speaker volume level.

It is understood that a rectangular bar graph in a vertical or horizontal orientation could be used in place of the triangular bar graph 26, with the up and down arrows and keys substituting for the left and right arrows and keys for vertical cases and the left or right arrow and key substituting for the down arrow and key to activate a speaker beep in vertical cases.

Figure 4:
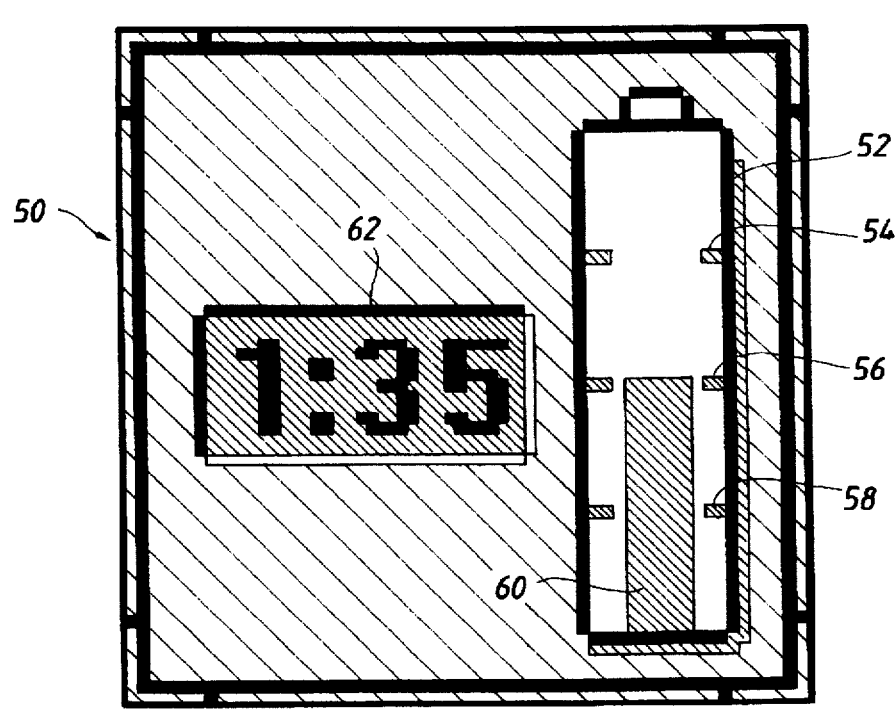
FIG. 4 is the display icon utilized to indicate remaining battery energy and computer operating time according to the present invention.

Referring now to FIG. 4, a fuel gauge or energy remaining icon 50 is shown. Incorporated in the icon 50 is a profile or side representation 52 of a battery. Located inside the representation 52 of the battery are hash marks 54, 56 and 58 representing, respectively, three-quarters, one-half and one-quarter energy remaining in the battery of the notebook computer N. Located inside the battery representation 52 is bar 60 which is used to indicate the actual energy remaining in the battery. This energy can be determined by the notebook computer N in a number of various ways, preferably that indicated in allowed co-pending patent application Ser. No. 07/825,638, entitled Battery Charge Monitor and Fuel Gauge, filed concurrently herewith, where the actual discharge current is monitored and time integrated to develop discharge energy values. Other techniques for approximating remaining battery energy are well known in the art and are not detailed in this application. As the remaining battery energy varies, the bar graph 60 is raised and lowered appropriately so that by looking at the icon 50 the user can determine the relative remaining battery energy. Located adjacent to the battery representation 52 is a time display 62. The time display 62 is used to provide the estimated time remaining until the battery is depleted. This estimate is based on the remaining energy in the battery and the current rate of consumption as determined by the notebook computer N. The consumption is readily developed by monitoring the current flow or discharge rate of the batteries and utilizing that value in combination with the remaining battery energy so that an estimated time can be developed.

FIGS. 5A–5D illustrate display icons used to provide the user with feedback of the power conservation levels being utilized by the notebook computer N. As stated in the summary, the notebook computer according to the preferred embodiment preferably utilizes power conservation techniques to extend battery life. Commonly included in these techniques and included in the preferred embodiment are the shut down of various peripheral devices, such as the LCD D itself, the florescent lamps used to perform the backlighting function of the LCD D, the hard disk drive, the floppy disk drive and the modem units located in the notebook computer N and various other circuitry located in the notebook computer N. By shutting off various portions of these devices and slowing down the clock rate of the microprocessor in the notebook computer N, the power consumption of the notebook computer N can be varied over relatively wide ranges. The notebook computer N of the preferred embodiment includes four different power conservation level settings. The first setting in the preferred embodiment is a no conservation level, where none of the devices or circuitry are powered down after any period time of non-use. The second level is considered to be a medium level of power conservation, where the various devices are turned off after a preset medium amount of time. A third level is referred to as high conservation, where the various devices are turned off after a shorter period of time then that in medium conservation level and the absolute brightness of the display D is limited to a factor below maximum, preferably to 50% of maximum. The fourth conservation level setting is one which is considered to be user definable, that is, the user has the capability to set the actual delay time values for each of the particular devices and circuitry. This selection is done utilizing a menu layout according to the prior art. When a particular power conservation level is active, the delay time values associated with that level are used by the notebook computer N for timing purposes.

Figure 5A:
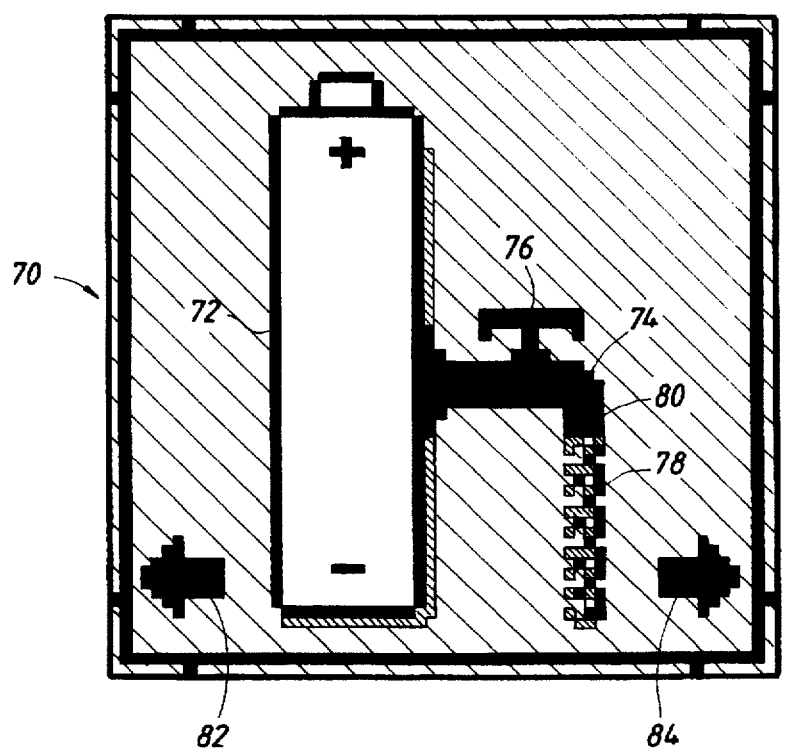
FIGS. 5A, 5B, 5C and 5D illustrate four different display icons according to the present invention for indicating the power conservation level being utilized by the notebook computer of FIG. 1.

Because there are four conservation levels in the preferred embodiment, it is desirable to indicate to the user which level is actually being employed and to allow the user to readily change levels. To this end the series of icons of FIGS. 5A–5D are indicated. When the user presses the special function key Fn and the F7 key in the preferred embodiment, the appropriate icon appears. For purposes of this discussion we will assume that no power conservation is being utilized, in which case the no conservation icon 70 shown in FIG. 5A is displayed on the LCD D. Incorporated in the icon 70 is a side view or profile view of a battery 72. Protruding from one side of the battery 72, the battery 72 being located in a vertical position, is a faucet 74, the faucet 74 having a valve 76 located on the top. A representation of a stream of water 78 is exiting the faucet spout 80. In the case of the icon 70, the no power conservation icon, the representative water flow 78 is very high, indicating a relatively high drainage rate of the battery 72. Also present on the icon 70 are left and right arrows 82 and 84, which are used to indicate that the left and right arrow keys cycle the user through the sequence of power conservation level settings.

Figure 5B:
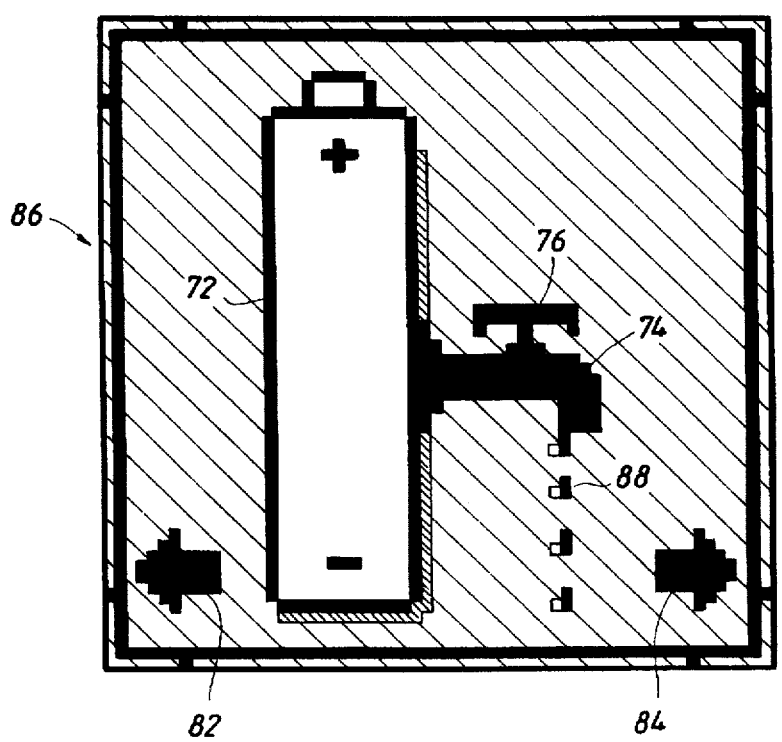
Figure 5C:
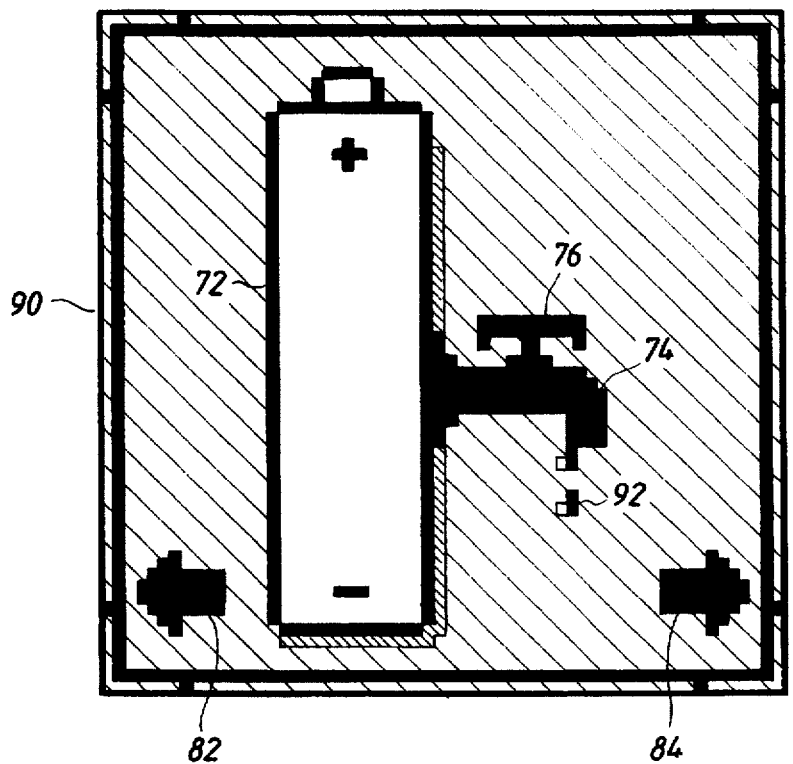
Figure 5D:
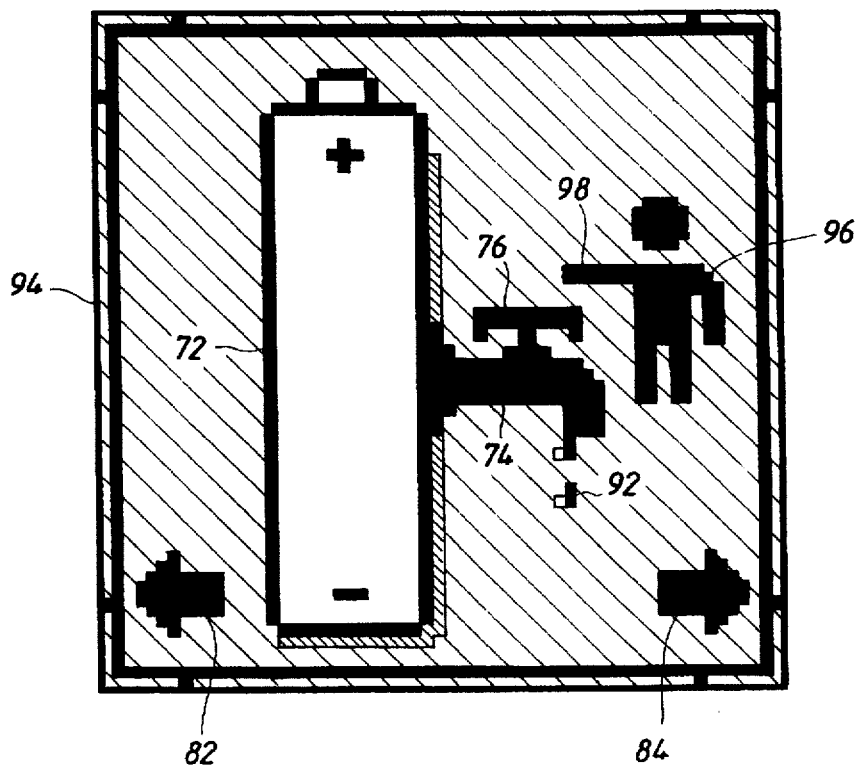

For example, if the user depresses the right arrow key, the icon 86 for the medium conservation level as shown in FIG. 5B, is displayed on the LCD D. In the icon 86 the water flow rate from the faucet 74 is a low to medium trickle level 88, as indicated by the single row of dashed lines. Thus the user can see a definite difference between the full water flow rate 78 and the medium trickle rate 88 of the no power conservation and medium power conservation settings. If the user again depresses the right arrow key, the high conservation icon 90 is displayed. In this icon 90 the water draining from the faucet 74 is a very slow trickle, as indicated by the water flow 92. In this case there are only several dashes in the line and a complete line is not displayed. This indicates to the user that a very low amount of energy or water is being drained from the battery, thus indicating a high energy conservation rate.

If the user were to again depress the right arrow key, the fourth icon or custom icon 94 is displayed. In this custom icon 94, a representation of a person 96 is located adjacent the faucet 74, with the arm 98 of the person approaching the valve 76. This is an indication to the user that a human has control of the energy rate as indicated by the arm 98 approaching the valve 76, so that the flow rate from the battery can be varied as desired. Thus this provides a ready indication to the user of the custom setting of the power conservation level. By depressing an indicated key when the custom icon 94 is displayed, a setting menu, for setting the various device delay times, appears. If the user were to once again depress the right arrow key, the no conservation level icon 70 would be displayed.

It is understood that the software controlling the notebook computer N not only displays the appropriate icon but if the display and selection function is exited, for example by hitting one of the other function keys as designated or an escape key, that particular power conservation level is then set into effect for use by the notebook computer N. Thus by activating the power conservation level setting feature, the user can both readily determine the actual power conservation level settings being utilized by the notebook computer N and change them with no reference to various manuals or arbitrary settings.

Therefore a notebook computer N according to the present invention has simplified user interfaces for allowing setting of speaker volume and power conservation levels. The interfaces are intuitive so that the user must not perform extended iterative operations to determine and set speaker volume or to adjust power conservation levels but merely depresses a few simple keys, the effect of which is readily displayed on the LCD D. Thus a simple, quick and effective user interface for these functions is shown in the preferred embodiment.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. In a battery-powered, microprocessor-based computer system having peripheral devices and a clock for the microprocessor with power conservation features including structure to vary the number and state of peripheral devices in operation and structure to adjust the clock rate of the microprocessor, a user interface for selecting and indicating the power conservation level of the battery-powered computer system, the user interface comprising:

means selectively forming a plurality of display images, each display image including:
        a representation of a battery;
        a representation of a faucet projecting from said battery representation; and
        means to indicate selection of a change in said plurality of display images and related power conservation level,
    a first one of said display images having a representation of a first, high level of water flowing from the faucet and being related to a lowest level of power conservation, a second one of said display images having a representation of a second, lower level of water flowing from the faucet and being related to an intermediate level of power conservation, and another one of said display images having a representation of a user located adjacent the faucet and being related to a user selected level of power conservation; and
    user operable key means in the computer system coupled to said means selectively forming a plurality of display images for adjusting the indicated selection of change find cycling through available power conservation levels and their related display images and thereby selecting a change in said display image being presented and the related power conservation level.

2. The user interface of claim 1, wherein a third one of said display images has a representation of a third, lowest level of water flowing from the faucet and is related to a high level of power conservation.

3. The user interface of claim 1, wherein said user operable key means for selecting a change includes left arrow and right arrow keys of the computer system.

4. The user interface of claim 1, further including:
means for requesting an indication of the power conservation level being employed by the computer system.

5. The user interface of claim 4, wherein:
said means for requesting comprises a function key in the computer system.

6. In a battery-powered, microprocessor-based computer system having peripheral devices and a clock for the microprocessor with power conversation features including structure to vary the number and state of peripheral devices in operation and structure to adjust the clock rate of the microprocessor, an apparatus for selecting and indicating the power conservation level of the battery-powered computer system, the apparatus comprising:
means for displaying a plurality of display images, each display image including:
a representation of a battery;
a representation of a faucet projecting from said battery representation; and
means to indicate selection of a change in said plurality of displays and related power conservation level,
a first one of said display images having a representation of a first, high level of water flowing from the faucet and being related to a lowest level of power conservation, a second one of said display images having a representation of a second, lower level of water flowing from the faucet and being related to an intermediate level of power conservation, and another one of said display images having a representation era user located adjacent the faucet axed being related to a user selected level of power conservation; and
user operable key means in the computer system coupled to said means for displaying for adjusting the indicated selection of change cycling through available power conservation levels and their related display images and thereby selecting a change in said display being presented and the related power conservation level.

7. The apparatus of claim 6, wherein a third one of said display images has a representation of a third, lowest level of water flowing from the faucet and is related to a highest level of power conservation.

8. The apparatus of claim 6, wherein said user operable key means for selecting a change includes left arrow and right arrow keys of the computer system.

9. The apparatus of claim 6, further including:
means for requesting an indication of the power conservation level being employed by the computer system.

10. The apparatus of claim 9, wherein:
said means for requesting comprises a function key in the computer system.

11. In a battery-powered, microprocessor-based computer system having peripheral devices and a clock for the microprocessor with power conservation features including structure to vary the number and state of peripheral devices in operation and structure to adjust the clock rate of the microprocessor, a method for selecting and indicating the power conservation level of the battery-powered computer system, the method comprising the steps of:
presenting a selected one of plurality of power conservation level display images when requested, the display images indicating the levels of power conservation of lhe computer system and including:
a representation of a battery;
a representation of faucet projecting from said battery representation; and
means to indicate selection of a change in said plurality of displays and related power conservation level,
a first one of said display images having a representation of a first, high level of water flowing from the faucet and being related to a lowest level of power conservation, a second one of said displays having a representation of a second, lower level of water flowing from the faucet and being related to an intermediate level of power conservation, and another one of the display images having a representation of a user located adjacent the faucet and being related to a user selected level of power conservation; and
adjusting the indicated selection of change in response to a user request by cycling through available power conservation levels and their related display images, thereby selecting a change in said display image being presented and the related power conservation level of the computer system.

12. The method of claim 11, including a third one of said display images having a representation of a third, lowest level of water flowing from the faucet and being related to a highest level of power conservation.

13. The method of claim 11, further including the step of:
requesting an indication of the power conservation level being employed by the computer system.

* * * * *

UNITED STATES PATENT AND TRADEMARK OFFICE
CERTIFICATE OF CORRECTION

PATENT NO. : 5,640,176
DATED : JUNE 17, 1997
INVENTOR(S) : KEVIN W. MUNDT; RANDALL L. HESS; DAVID B. POTTER

It is certified that error appears in the above-indentified patent and that said Letters Patent is hereby corrected as shown below:

CLAIM 6, LINE 44, PLEASE DELETE "ERA" AND INSERT --OF A--.

CLAIM 6, LINE 44, PLEASE DELETE "AXED" AND INSERT --AND--.

CLAIM 6, LINE 49, PLEASE INSERT --AND-- BETWEEN "CHANGE" AND "CYCLING".

CLAIM 11, LINE 23, PLEASE DELETE "1HE" AND INSERT --THE--.

CLAIM 11, LINE 25, PLEASE INSERT --A-- BETWEEN "OF" AND "FAUCET".

Signed and Sealed this

Second Day of September, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,640,176
DATED : June 17, 1997
INVENTOR(S) : Kevin Warren Mundt et al.

It is certified that error appears in the above-identified patent and that said Letters Patent is hereby corrected as shown below:

Column 9,
Line 2, delete "find" and insert -- and --.

Signed and Sealed this

Twentieth Day of December, 2005

JON W. DUDAS
*Director of the United States Patent and Trademark Office*